United States Patent
Starr et al.

(10) Patent No.: US 11,727,568 B2
(45) Date of Patent: Aug. 15, 2023

(54) RAPID ILLNESS SCREENING OF A POPULATION USING COMPUTER VISION AND MULTISPECTRAL DATA

(71) Applicant: JAR Scientific LLC, West Mifflin, PA (US)

(72) Inventors: Justin Starr, Baden, PA (US); Ashish Basuray, Petaluma, CA (US); Roman Kazantsev, Fremont, CA (US); Randolf Reiss, Dripping Springs, TX (US)

(73) Assignee: JAR Scientific, LLC, West Mifflin, PA (US)

( * ) Notice: Subject to any disclaimer, the term of this patent is extended or adjusted under 35 U.S.C. 154(b) by 30 days.

(21) Appl. No.: 17/209,999

(22) Filed: Mar. 23, 2021

(65) Prior Publication Data

US 2021/0304406 A1     Sep. 30, 2021

Related U.S. Application Data (60) Provisional application No. 62/993,856, filed on Mar. 24, 2020.

(51) Int. Cl.
| | |
|---|---|
| *G06T 1/00* | (2006.01) |
| *G06T 7/00* | (2017.01) |
| *G06F 3/01* | (2006.01) |
| *G01K 1/02* | (2021.01) |

(52) U.S. Cl.
CPC ............ G06T 7/0014 (2013.01); G06F 3/017 (2013.01); G01K 1/026 (2013.01); *G06T 2207/20081* (2013.01); *G06T 2207/20084* (2013.01); *G06T 2207/30196* (2013.01)

(58) Field of Classification Search
CPC ......... G06T 7/0014; G06T 2207/20081; G06T 2207/20084; G06T 2207/30196; G06F 3/017; G01K 1/026
USPC ........................................................ 382/100
See application file for complete search history.

(56) References Cited

U.S. PATENT DOCUMENTS

| | | | |
|---|---|---|---|
| 9,008,391 B1 * | 4/2015 | Solanki | G06T 5/20 382/128 |
| 2013/0208963 A1 * | 8/2013 | Leal | G06T 7/0014 382/128 |
| 2016/0022193 A1 * | 1/2016 | Rau | A61B 5/165 600/595 |
| 2019/0081945 A1 * | 3/2019 | Chiang | H04L 63/0861 |
| 2020/0214626 A1 * | 7/2020 | Boyle | A61B 5/742 |

FOREIGN PATENT DOCUMENTS

EP            3531343 A2 *   8/2019   ......... G06K 9/00335

* cited by examiner

*Primary Examiner* — Gabriel I Garcia
(74) *Attorney, Agent, or Firm* — Gabriel & Co; Andrew M Gabriel (57) ABSTRACT

An embodiment provides a method including obtaining, using a camera system, imagery of one or more individuals in an environment; analyzing, using a processor, the individual data using a trained model to identify individuals and recognize gestures that are indicative of sickness behavior; presenting, using a display device, information about individuals that have displayed sickness behavior above a calculated threshold.

14 Claims, 8 Drawing Sheets

RAPID ILLNESS SCREENING OF A POPULATION USING COMPUTER VISION AND MULTISPECTRAL DATA

FIELD

An embodiment operates in the field of automated or semi-automated image analysis of individuals.

BACKGROUND

In 2016, the WHO reported that infectious diseases made up three of the top ten leading causes of death worldwide— lower respiratory infections, diarrheal diseases and tuberculosis kill far more people than hunger, accidents and crime. The problem is amplified in lower income countries where five of the top ten leading causes of death are caused by infectious diseases, and the number one cause of death is lower respiratory infections. While there is no magic bullet to cure infectious diseases, their spread can be controlled and managed with appropriate public health measures. Sanitation, antibiotics and isolation of infected individuals can work to mitigate the spread of infectious disease, but requires early identification of an individual carrying an infection—a process that has historically required access to expensive medical personnel and testing equipment.

Artificial intelligence can provide a democratizing force in this area. While not able (or intended) to replace the opinions of medical professionals, by observing human behavior over a period of time, AI can draw conclusions about the underlying individual. Individuals also engage in sickness behaviors when they are ill. People cough, sneeze, hold aching muscles, shift their weight to minimize stomach cramps, and generally act in a way that is indicative of their sickness. Training AI to detect these behaviors could provide a valuable, non invasive screening tool that can help triage a population and focus medical professionals.

A 2018 study estimates that sickness causes more than 1.4 billion days of work absence, and US employers incur $530 billion in direct costs, lost productivity and impaired performance. Clearly, both the public and private sectors have vested health and economic interests in keeping the population healthy and minimizing the spread of infectious diseases.

Individuals may transmit a disease prior to being aware of having the disease. These individuals may be difficult to identify using human review or traditional testing. Further, individuals may find it difficult to adhere to best practices for avoiding disease spread, even if aware that the illness is present.

Accordingly, it is desirable for a system and method for accurately detecting and monitoring disease spread using a fusion of sensors and algorithms. In addition, it is desirable for a system that can detect and monitor disease spread in real time or near-real time. A tool that enables the screening of a population using a fusion of sensors and algorithms enables institutions and agencies to promote preventative health and reduce the spread of infection.

SUMMARY

In summary, an embodiment provides a method, comprising: obtaining, using a camera system, video or static imagery of one or more individuals in an environment; analyzing, using a processor, the individual data using a trained model to identify individuals and recognize gestures that are indicative of sickness behavior; and presenting, using a display device, information about individuals that have displayed sickness behavior above a calculated threshold.

In an embodiment, the camera system is supplemented by an infrared or multispectral imaging system that is capable of making temperature measurements.

In an embodiment, the temperature data can also be used as an indicator of sickness behavior.

In an embodiment, an individual can be identified and followed through multiple locations, such as rooms, covered by a CCTV system In an embodiment, data for an individual is stored and tabulated in a database spanning the individual's visit to the site. This database can be expanded based on multiple visits to a site or shared with other sites to build a more detailed sickness profile of an individual In an embodiment, the camera system could be comprised of a centralized network of cameras, a single camera, or multiple portable imaging systems Another embodiment provides a method, comprising: obtaining, using a camera system, one or more images or videos of a group of individuals; analyzing, using a processor, the image and video data using a trained model, where in the trained model is trained using one or more of the existing libraries of images, gesture recognition from multiple consecutive frames, heat signatures from infrared cameras or a fusion of more than one of the above; analyzing, using a processor, the unique identifiers corresponding to each individual recognized in the group, and creating a record in a database of that individual; analyzing, using a processor, sickness behaviors performed by each individual and appending those behaviors to a record in the database corresponding to that individual; and analyzing, using a processor, the identity of that individual, using other databases that are explicitly linked.

In an embodiment, the history of an individual's path and actions is recorded in a database for subsequent review.

In an embodiment, the individuals and materials a specific individual comes in contact with are aggregated and indexed by time.

In an embodiment, the identities of all individuals coming in contact with or proximity to a specific individual can be identified and stored in a database.

In an embodiment, the results of any individual can be sent to a display terminal along with any identifying information, a history of flagged images or gestures, and a visual description to enable intercepting by another individual.

In an embodiment, the individual's gesture history can be matched against signatures for various types or families of illnesses.

In an embodiment, the combination of one or more of closed-circuit television, RGB image data, infrared data, mm-wave data, THz spectroscopy, radar signals and lidar signals can be used to determine the person's illness.

In an embodiment, the sickness behaviors are further qualified using a trained algorithmic model to identify subtypes of behavior, including coughing, sneezing, wheezing, muscle position, joint position, verbal indicators, flatulence and tremors and others not listed.

In an embodiment, a system is provided for implementing the methods and features described herein.

In an embodiment, a computer program product comprising non-transitory media storing processor executable code is provided to implement the methods and features described herein.

The foregoing is a summary and thus may contain simplifications, generalizations, and omissions of detail; consequently, those skilled in the art will appreciate that the summary is illustrative only and is not intended to be in any way limiting.

DETAILED DESCRIPTION OF THE EMBODIMENTS

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As used in this application, the terms "component," "system," "subsystem," "platform," "controller," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer.

By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application.

As yet another example, a component can be an apparatus that provides specific functionality through electronic components without mechanical parts, the electronic components can include a processor therein to execute software or firmware that provides at least in part the functionality of the electronic components.

As further yet another example, interface(s) can include input/output (I/O) components as well as associated processor, application, or Application Programming Interface (API) components.

While the foregoing examples are directed to aspects of a component, the exemplified aspects or features also apply to a system, platform, interface, controller, and the like.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of modules refers to one or more modules.

The terms "a" or "an', as used herein, are defined as one or more than one. The term plurality, as used herein, is defined as two or more than two. The term "another", as used herein, is defined as at least a second or more. The terms "including" and "having," as used herein, are defined as comprising (i.e., open language). The term "coupled', as used herein, is defined as connected, although not necessarily directly, and not necessarily mechanically.

Various aspects or features will be presented in terms of systems that can include a number of devices, components, modules, and the like. It is to be understood and appreciated that the various systems can include additional devices, components, modules, etc. and/or may not include all of the devices, components, modules etc., discussed in connection with the figures. A combination of these approaches also can be used.

A problem associated with illness control is that people cannot be expected or relied upon to self-diagnose, particularly in circumstances where an individual may transmit the illness before becoming aware of the infection. Further, while a population may be accepting of movement restrictions for a short period of time, eventually individuals may decide that the need for movement is more important than the impact on public health. Economic shut down cannot be indefinite. After several months, people may not be willing to avoid mass transit, maintain separation while performing essential functions (such as shopping in grocery stores), cancelling optional travel (such as vacation travel). As another example, when companies, universities and schools reopen, parents, students and employees may not notice symptoms of illness. People may also not take their temperature every day or perform appropriate self-monitoring or isolation.

The problem of individual noncompliance with public health policies is not just theoretical. In the state of Hawaii, 182 individuals were arrested for failing to comply with mandatory coronavirus quarantine policies between March and June 2020. In South Korea, a country with high rates of public health compliance, between 0-8 individuals out of every group of 10,000 ordered to quarantine self-report violating these orders, putting thousands of individuals at risk. When a pandemic is not present, more than 9 out of 10 Americans report intentionally going to work when afflicted by symptoms of cold or flu, and 33% self-report "always" going to work, even if their presence could impact others.

In a typical workplace, this behavior can have significant costs for employers. For most employers, costs of mitigating the impact of sickness or preventing infection to others total 60% of the cost of benefits packages. For a company of 100 employees, preventing and coping with the presence of six employees has an annualized cost of more than $300,000. While the costs of the COVID-19 pandemic are not yet easily quantifiable (as of March 2021), the 2017-2018 flu season cost employers more than $21 billion in lost productivity. Since influenza can be spread from a sick person to others located up to 6 feet away by speaking or heavy breathing, one person can easily infect hundreds in a crowded production line.

An embodiment provides a method of rapidly screening a population at a distance for illness through a combination of thermal imaging and computer vision applied to a CCTV feed. Thermal imaging will be used to scan for individual's temperatures to detect fevers or other anomalies. Computer vision will use a neural network to detect and track individuals over time and tag sickness behaviors—touching of the face, holding the neck (aches), coughing into a fist. If an individual crosses a certain threshold—engaging in more sickness behaviors than the average group and/or showing signs of fever, the individual can be removed from the population for further clinical screening—such as swabs, assays or other tests.

Fever is not a necessary hallmark of sickness. Research indicates that individuals may passively engage in sickness behavior before becoming symptomatic as part of the body's immune response. Detecting these behaviors and quickly isolating individuals can be a key public health measure in preventing the spread of disease.

Embodiments are intended to learn through data acquisition, as information about true positives can be used to retrain the neural network. Bounded and unbounded learning will eventually lead the system to pick up on sickness behavior that would be difficult for a human to perceive.

Decision support software is provided on a console or mobile device to assist first responders in identifying, approaching and quickly separating the identified individual. History of video data can show all contacts that a potentially infected individual had with others. Actual identification is possible through explicit linking with other databases (e.g. DMV, Clearview AI, etc.), but will not automatically occur.

Eventually, disease signatures can be compiled through a fusion of temperature and gesture information making it possible to not just identify sickness, but certain types of sicknesses.

Example target audiences or users of an embodiment may include: federal, state, and local government—first responders. An embodiment may be deployed at areas where people mass or queue—airport screening, customs/immigration, entry points to schools, etc. An embodiment may observe groups in ER waiting areas to ID high risk patients, and even be used for business owners to prevent virulent Coronavirus variants spread in private facilities.

Figure 1:
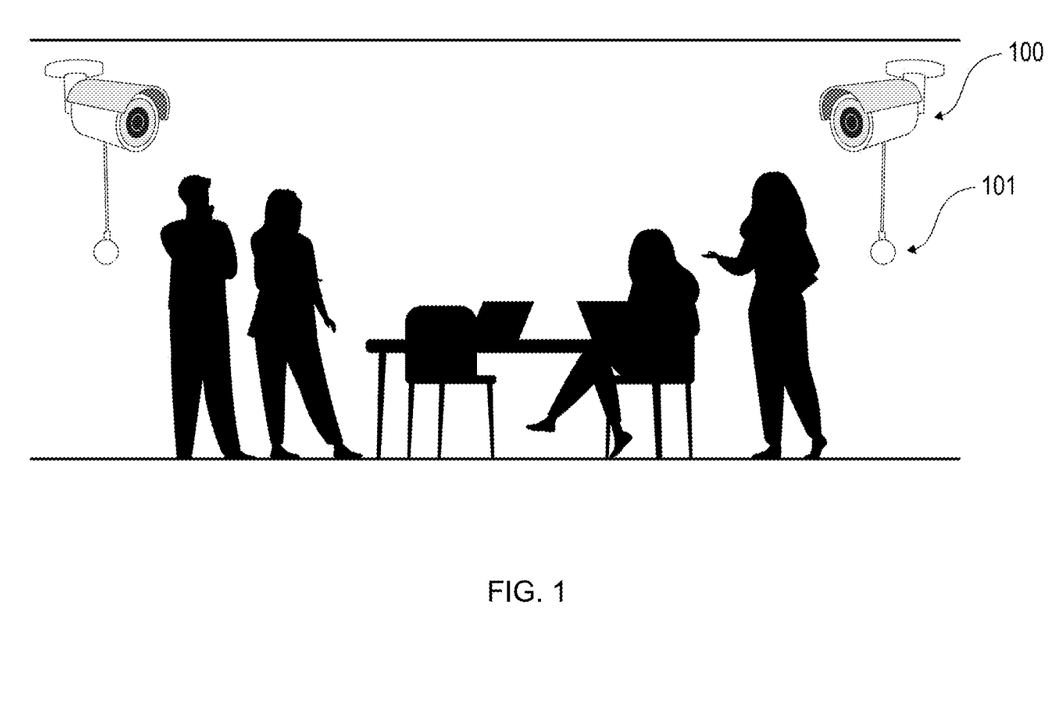
FIG. 1 illustrates an example method of rapidly screening a population using multispectral imaging and computer vision.

An embodiment provides a solution in the form of a camera unit that detects beyond visual fields. As shown in FIG. 1, a standard CCTV camera 100 can be equipped with a multispectral suite of sensors 101, including but not limited to closed-circuit television, RGB image data, infrared data, mm-wave data, audio signals, THz spectroscopy, radar signals and LIDAR signals. A single camera unit with sensor package has the ability to collect data from a variety of distributed sensors in the environment, including but not limited to mobile phones, desktop computers, or single-purpose embedded devices, such as wearable devices.

Figure 2:
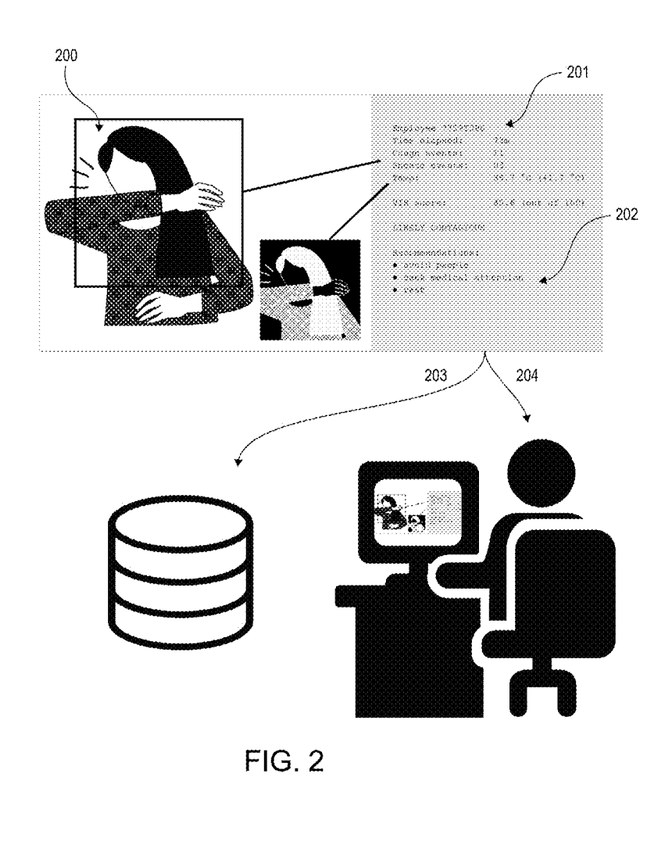
FIG. 2 illustrates an example of the computing device or system's output with a viral infection score (VIS) along with symptoms and recommendations as output from the algorithms prediction may be entered into a database for offsite processing or by a human observer that will analyze video and multispectral feeds.

The collected data is analyzed either in real-time or stored in a database for later evaluation. As shown in FIG. 2, an embodiment collects video and multispectral data and creating a visualized output of the subject analyzed 200, with detailed information that may include, but not limited to time elapsed, number of cough events, number of sneeze events, subject's temperature and their aggregated viral infection score (VIS) 201. In addition, the output may include decision support protocols that may include to support finding medical attention or informing a medical facility, the optimal time frame to take the suggested course of action and contact information to aid in the facilitation of the recommended steps 202. The visualized output, as well as the raw data associated with the algorithmic visualization could then be passed to a database 203 and/or to a computer terminal with human observer 204.

Figure 3:
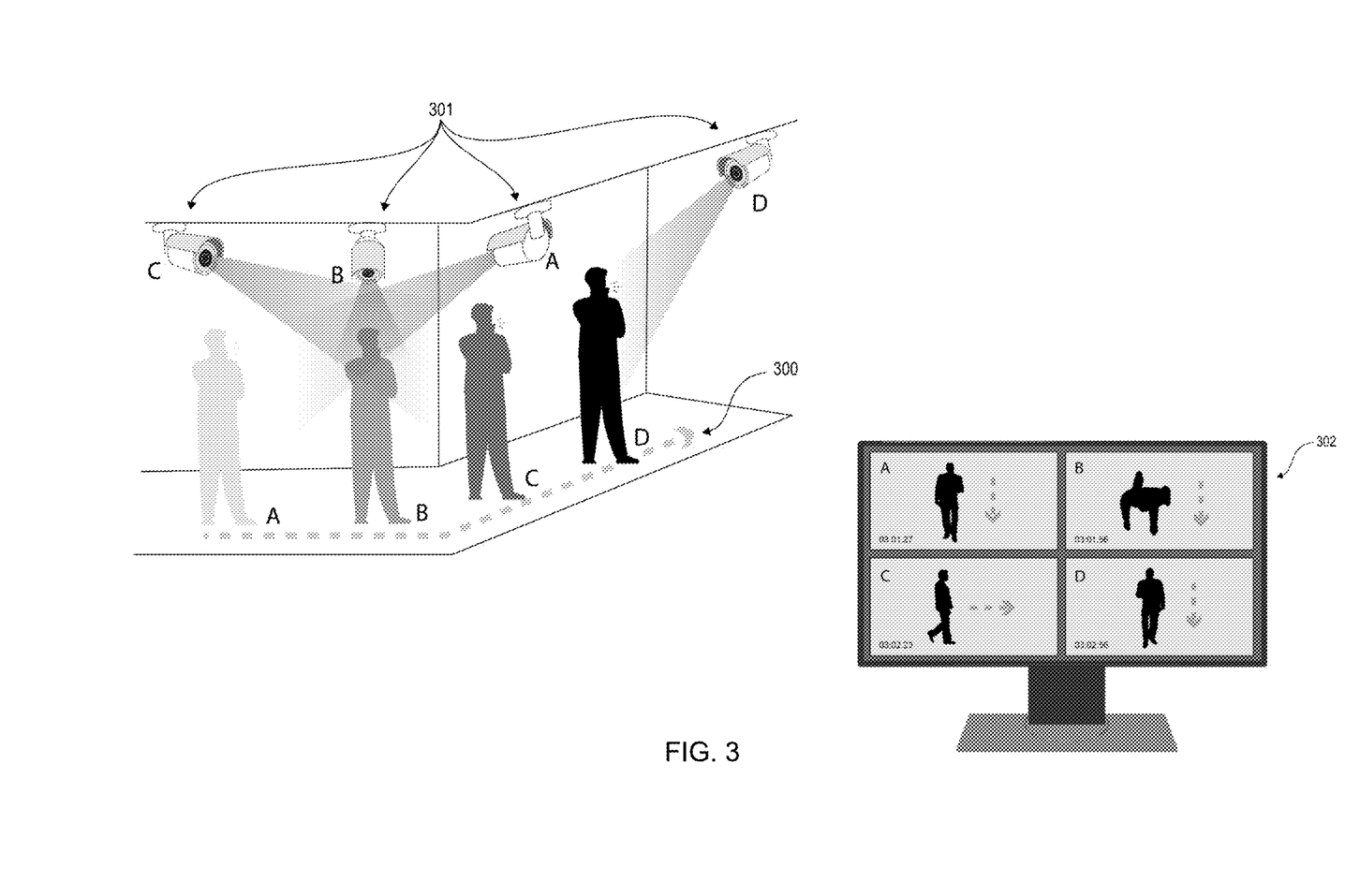
FIG. 3 illustrates as an example a person walking through a field of sensors, both visual and multispectral over a period of time, tracking the subject across different fields of vision. The composite score from multiple viewing angles are weighted into the person's viral infection score.

As a function of accurately being able to identify an individual's viral infection score, the system must be able to integrate multiple camera units containing a composite of video and multispectral data. In an embodiment, as shown in FIG. 3, an individual 300, traveling across multiple camera's field of view may combine multiple camera systems 301 across different visual and spectral environments, accurately identifying the same individual from different angles and points of view. In addition, the multi camera system may track an individual with persistence, using the suite of sensors to create a temporary unique composite identifier, across different camera units and fields of view 302.

For example, if this system were installed in a workplace with a multi-camera system observing several rooms, an individual could be observed and monitored the entire time they are in-view of some element of the CCTV system. For example, if a camera in an office captures a coughing event, and a camera in the break room captures an additional coughing event, both of those events would be added to the record of the individual, even though they are observed on different CCTV systems. This could also occur in a public space like an airport, as an individual's level of sickness could be calculated as they are observed as they complete check in, enter security screening, walk through the concourse, and wait at a gate. For large spaces, this persistence is critical, as even sick individuals do not frequently engage in sickness behaviors, and a comprehensive record of coughing will be necessary for sickness evaluation.

Figure 4:
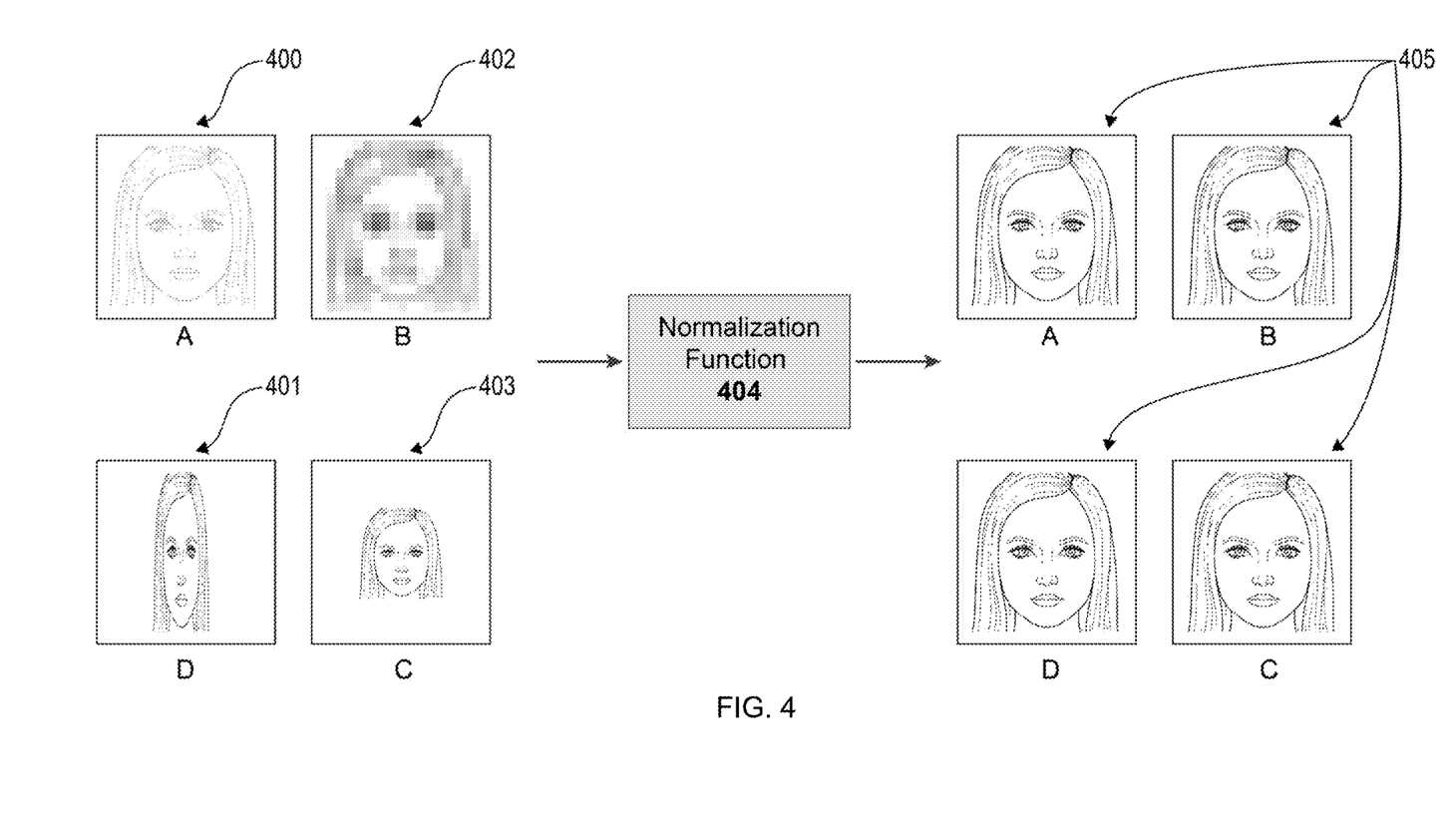
FIG. 4 illustrates as an example the algorithmic adjustment of a person's distorted image due to a variety of input limitations, including but not limited to Aspect ratio, pixelation, size of person in photo, brightness/contrast. The algorithmic transformation results in normalized video feed, enhancing accuracy of the input data for the algorithm to detect illness.

For the system to provide an accurate viral infection score, the system must be able to preprocess the video and multispectral data to normalize the subject in focus. A processor may analyze, including but not limited to image and spectral data consisting of a combination of one or more of brightness, contrast, resolution, dimensions, aspect ratio, color saturation, noise level, signal intensity and refresh rate to determine a signature for a given location. Then, using a processor, the system may perform transformations that can be applied to incoming data to normalize said data to match the location signature previously determined and identify differences between training a model using normalized data and untransformed signals. As shown in FIG. 4, an embodiment demonstrates that raw video input may be subject to brightness 400, aspect ratio dilation 401, contrast 402, pixelation 403, but through the use of the system via processor, the images may be normalized 404, increasing the accuracy for a viral infection score when then read by the artificial intelligence algorithm. An algorithm preprocessing step that normalizes images before being run through an artificial intelligence algorithm enhances accuracy of the inference score. In an embodiment of concept, utilizing several CCTV and multispectral camera systems 301 across an office building may have identified an individual 300 exhibiting gestures and multispectral data suggesting they may have an infectious or contagious disease. The individual is transiting across several camera views, thus their input image and data signature is changing as a function of natural and artificial lighting causing oversaturation of the images 400, rapid movement causing pixelation 402, and moving towards and then away from the observing camera 301 causing aspect ratio dilation 401. Through the normalization function step 404, the algorithm can maintain persistence tracking of the individual with greater accuracy than using the preprocessed images.

Figure 5:
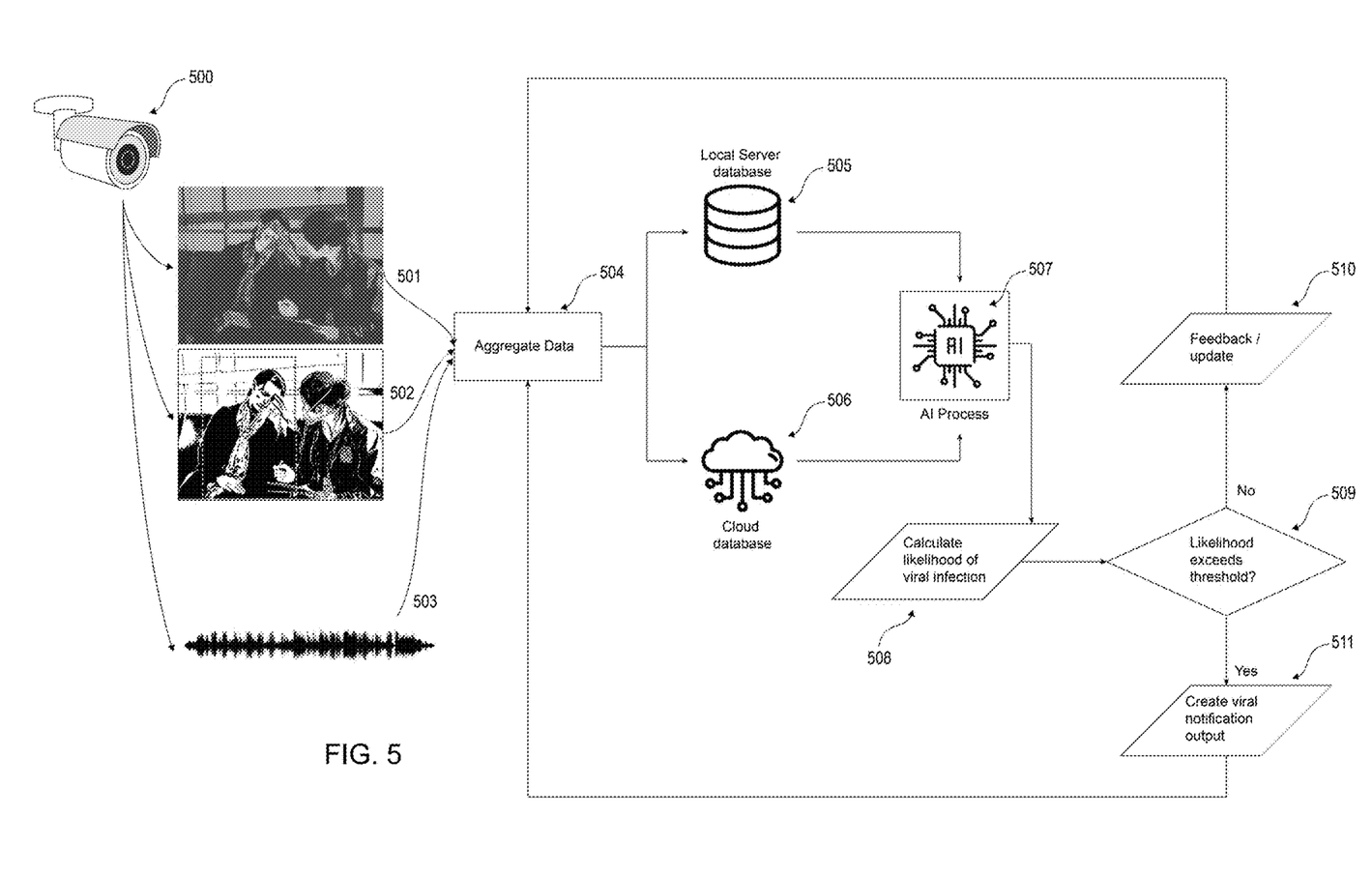
FIG. 5 illustrates as an example the software architecture required to process the video and multispectral feeds, how it's processed, analyzed and stored.

The processing of streaming video data is a function of the data aggregation and how the data is processed stored, propagated as a function of decision support. In the embodiment, as shown in FIG. 5, the camera system 500 may receive and process multiple parallel signals feeds including visual video 501, thermal video 502 and audio signals 503, which are then processed at the location (on the edge) and aggregated 504. The aggregated data 504 may be normalized through a pre-artificial intelligence processing algorithmic step delineated in FIG. 4 as the normalization process 404. Once the data feeds are consolidated and preprocessed, the data may be retained on local servers and databases 505 and/or transmitted to a distributed cloud processing server (i.e., Amazon Web Services) 506. At the respective location, the consolidated and curated feed 504 will be processed through a convolutional neural network 507. The algorithm is trained on thousands of examples that creates a baseline accuracy for inference. The artificial intelligence model trained on thousands of hours of video and multispectral data contains a variety of classifiers that may include, but not limited to: i) specific types of coughs (i.e., wet coughs, wheezing coughs, dry coughs), ii) the function of a cough as defined by gestural movements with the hand, neck muscles, eyes, arms and mouth, iii) thermal abnormalities on exposed skin, iv) sweat detection, v) visual mucosal and phlegm detection including gestural movements such as wiping nose, hacking coughs, vi) respiratory sounds including wheezing, restricted airway breathing, gasping for air, vii) skin discoloration, e.g., hypoxia or jaundice, vasocongestion viii) auditory rhinorrhea, ix) gestural movements to indicate a restricted airflow including holding the throat, signaling or pointing at mouth or throat, x) convulsions or seizure like gestural movements and behaviors.

The artificial intelligence model inputs the visual, auditory and other multispectral inputs and performs an inference calculation that is a summation of probabilistic sickness/illness events. The algorithm may identify an individual and identify a series of distinguishing characteristics that enables persistent tracking of an individual 302. Throughout the duration of persistence tracking for the individual, the algorithm will collect and analyze data leveraging the aforementioned variables, in combination or individually to calculate the likelihood of a viral infection or illness event 508. The algorithm may discard data that has been determined to generate a false positive, for example, if the person is drinking from a water bottle, the gestures may resemble certain illness behaviors, however the water bottle and other visual and multispectral data may indicate a higher probability for a false positive, and thus the model may require further signals before concluding calculation on the viral infection score.

An embodiment of the output may add a data layer that annotates the respective video and multispectral data streams with viral infection score data, that may include temperature, number of coughs, unique health data from health devices or mobile phones, or recommended protocols. If the likelihood of a viral has been demonstrated in the trained model to cross the threshold of a person with a plausible probability, it will generate a viral notification output data flow that may inform people monitoring the system through a combination of possible alerts, emails, text notifications, phone calls, or dispatch signals. Different disease states may be identified by the algorithm, for example a viral infection with higher probability of contagion, versus an acute medical condition such as a seizure can be determined through a combination of illness variables, previously mentioned. Based on the nature of the disease detection, different thresholding limits can be created. In an embodiment for determining a high contagion viral detector, the algorithm may be trained to weight certain events with more importance, for example repetitive coughing and skin temperature greater than 37° C. In another embodiment, the algorithm may be trained to detect restricted airways by having audio inputs of gasping for air along with rapid blue-hued skin discoloration, indicative of hypoxia. For the calibrated illness classifier, the determination of illness from the calculated score 508 will reach a logic gate 509 wherein either the score remains below the threshold score determined and proceeds through a feedback and update loop 510, and reporting updated data to the aggregated data 504 and repeats through the logic loop, or the classifier threshold is exceeded wherein the a new notification will be generated 511 and the data will be combined with newly aggregated data 504 and repeats through the logic loop for continual data processing.

Figure 6:
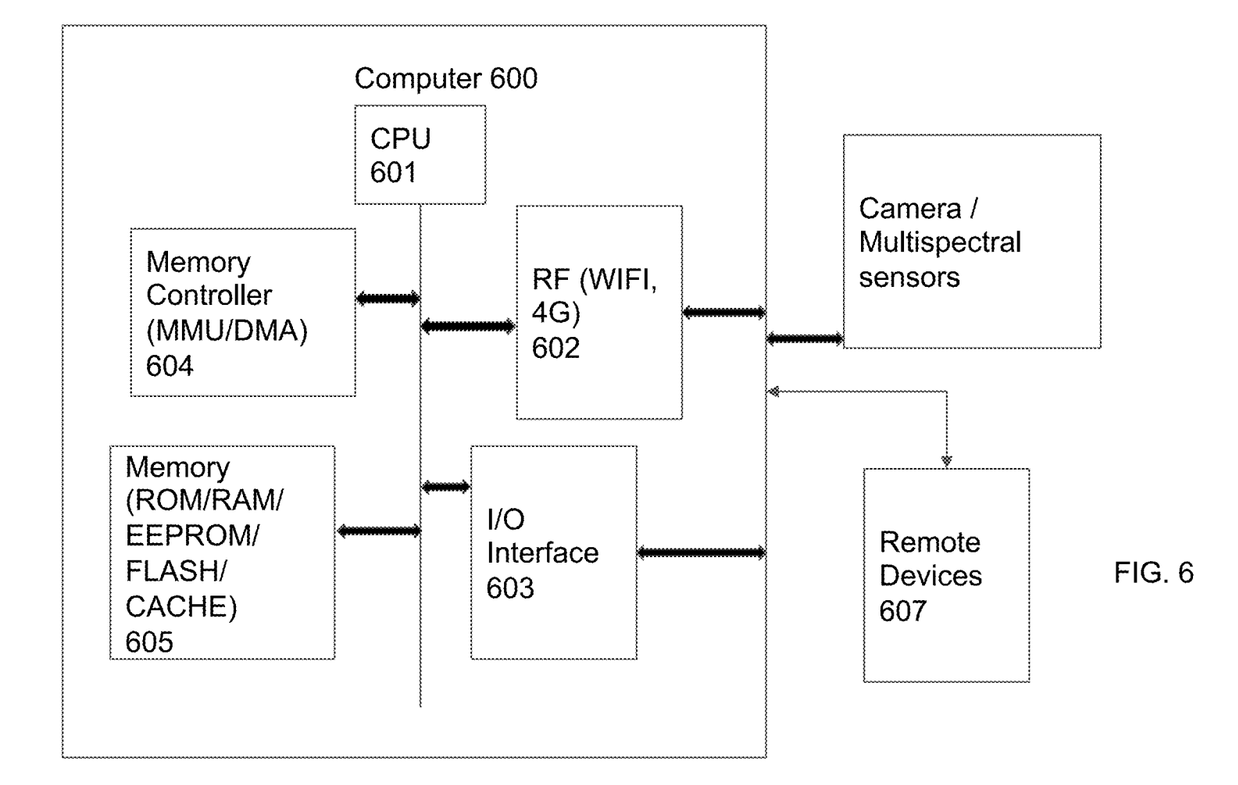
FIG. 6 illustrates as an example the system on chip (SoC) included in a computer is illustrated, which may be used in implementing one or more embodiments, including multispectral pre-processing or running algorithms on the local device.

It will be readily understood that certain embodiments can be implemented using any of a wide variety of devices or combinations of devices. Referring to FIG. 6, an example system on chip (SoC) included in a computer 600 is illustrated, which may be used in implementing one or more embodiments. The SoC or similar circuitry outlined in FIG. 6 may be implemented in a variety of devices in addition to the computer 600, for example similar circuitry may be included in a camera or another device platform. In addition, circuitry other than a SoC, an example of which is provided in FIG. 6, may be utilized in one or more embodiments. The SoC of FIG. 6 includes functional blocks, as illustrated, integrated onto a single semiconductor chip to meet specific application requirements.

The central processing unit (CPU) 601, which may include one or more graphics processing units (GPUs) and/or micro-processing units (MPUs), includes an arithmetic logic unit (ALU) that performs arithmetic and logic operations, instruction decoder that decodes instructions and provides information to a timing and control unit, as well as registers for temporary data storage. The CPU 601 may comprise a single integrated circuit comprising several units, the design and arrangement of which vary according to the architecture chosen.

Computer 600 also includes a memory controller 604, e.g., comprising a direct memory access (DMA) controller to transfer data between memory 605 and hardware peripherals. Memory controller 604 includes a memory management unit (MMU) that functions to handle cache control, memory protection, and virtual memory. Computer 600 may include controllers for communication using various communication protocols (e.g., I2C, USB, etc.).

Memory 605 may include a variety of memory types, volatile and nonvolatile, e.g., read only memory (ROM), random access memory (RAM), electrically erasable programmable read only memory (EEPROM), Flash memory, and cache memory. Memory 605 may include embedded programs and downloaded software, e.g., image processing software, computer vision software, etc. By way of example, and not limitation, memory 605 may also include an operating system, application programs, other program modules, and program data.

A system bus permits communication between various components of the computer 600. I/O interfaces 603 and radio frequency (RF) devices 602, e.g., WIFI and telecommunication radios, are included to permit computer 600 to send and receive data to remote devices using wired or wireless mechanisms. The computer 600 may operate in a networked or distributed environment using logical connections to one or more other remote computers or databases. The logical connections may include a network, such local area network (LAN) or a wide area network (WAN), but may also include other networks/buses. For example, computer 600 may communicate data with and between remote device(s) 607a the perform various functions described herein, e.g., gesture analysis or thermal image analysis.

The computer 600 may therefore execute program instructions configured to store and analyze image or video data, and perform other functionality of the embodiments, as described herein. A user can interface with (for example, enter commands and information) the computer 600 through input devices, which may be connected to I/O interfaces 603. A display or other type of device 607a, may also be connected to the computer 600 via an interface selected from I/O interfaces 603, such as an output interface.

It should be noted that the various functions described herein may be implemented using instructions stored on a memory, e.g., memory 605, that are transmitted to and executed by a processor, e.g., CPU 601. Computer 600 includes one or more storage devices that persistently store programs and other data. A storage device, as used herein, is a non-transitory storage medium. Some additional examples of a non-transitory storage device or medium include, but are not limited to, storage integral to computer 600, such as a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations may be written in any combination of one or more programming languages. The program code may execute entirely on a single device, partly on a single device, as a stand-alone software package, partly on a single device and partly on another device, or entirely on another device. In some cases, the devices may be connected through any type of connection or network, including a local area network (LAN) or a wide area network (WAN), or the connection may be made through other devices (for example, through the Internet using an Internet Service Provider), through wireless connections or through a hard wire connection, such as over a USB connection.

Figure 7:
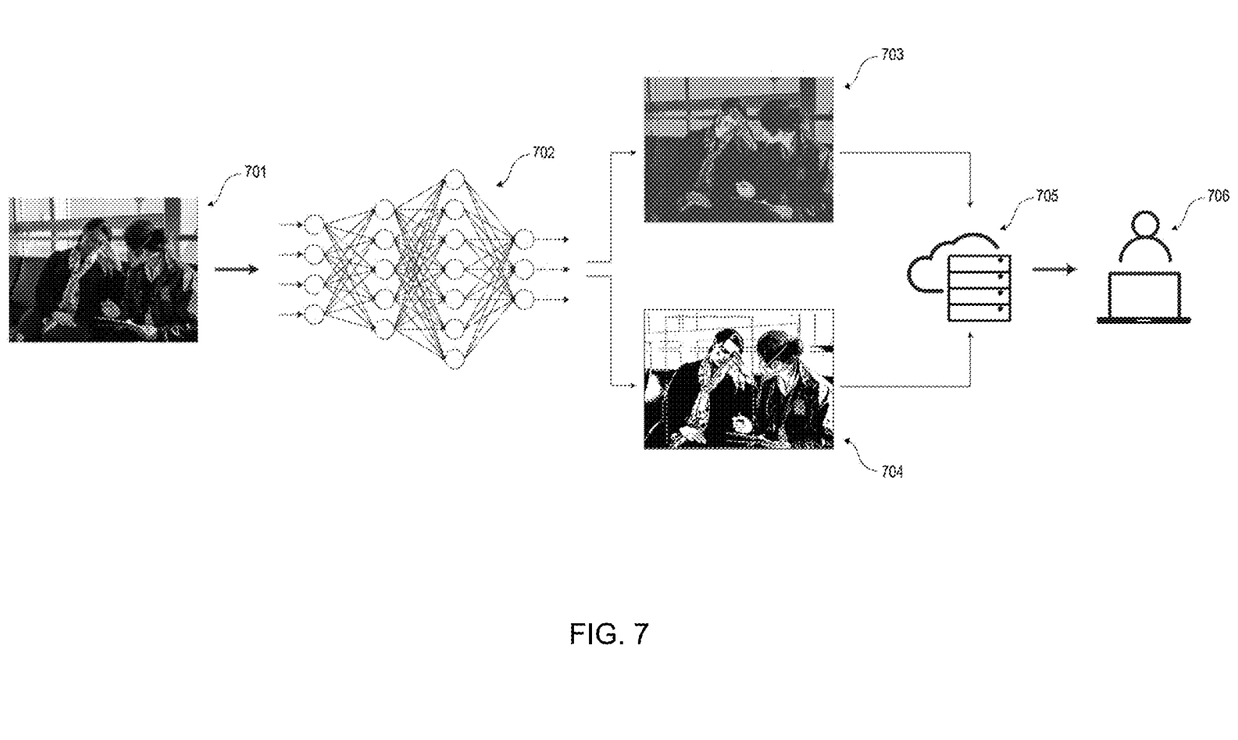
FIG. 7 illustrates as an example the use of an artificial intelligence, deep learning convolutional neural network to process visual and multispectral inputs and create a viral infection score.

An embodiment provides a continually improving artificial intelligence (AI), low-cost and non-invasive screening mechanism through removing false positives and retraining the model. As shown in FIG. 7, an embodiment enables manual process improvement and removal of false positives through manual review of post-processed thermal image analysis with gesture recognition before passing data for decision support.

A common challenge with artificial intelligence algorithms is the false positive rate, and model overfitting. Finding the right threshold for the artificial intelligence algorithm requires continual improvements through auditing edge case events, or low probability inferences. To date, there has been no industrially proven algorithm that can self-train using edge cases successfully. Human intervention has been proven to increase model accuracy over time through auditing low probability events.

In a phase of analysis, video and multispectral image(s) are captured, e.g., using a camera such as included in a CCTV system equipped with a thermal lens 701 are subjected to a thermal mapping routine. The thermal mapping routine may be implemented in a variety of ways, for example using an off-the-shelf thermal detection mechanism. In an embodiment, video and multispectral data are passed through a convolutional neural network 702. Based on training data, the convolutional neural network may output inference scores at a low confidence threshold. In an embodiment shown in FIG. 7, input data 701 is passed through a convolutional neural network 702 and the output presents low confidence threshold inferences for a thermal overlay 703 and gesture overlay 704. In this scenario, the temperature sensitivity settings of the system may be set at a threshold to avoid false positives, however if aberrant heat signature(s) is/are identified near a threshold with a low probability inference, the data may not immediately trigger a notification and instead pass the event to a database 705 which is then routed to human reviewer 706 for inspection, labeling and/or validation. Once the human reviewer approves or denies the specific event, the data rejoins the data flow in FIG. 5 and either sends a notification, in the event of a positive threshold, or no response and data is re-entered into the system. For example, in certain scenarios, human body temperature may be artificially elevated, for example atypical exercise location, core temperature as a function of body mass index, or raising body temperature through external heating such as spas, and saunas.

Similarly, in the gesture recognition phase, image(s) captured may be subjected to a gesture recognition analysis to identify illness gestures. These gestures may include but are not limited to coughing, shortness of breath/gasping for air, breathing difficulties/bending over to breathe, repeatedly covering mouth, or a suitable combination thereof. However low confidence threshold events that may trigger false positives should be suppressed as real signals. For example, drinking from a water bottle, holding their head in their hands for extended periods of time or yawning are all gestures that may present in early iterations of the master model but can be correctly identified over a period of time. When low probability/threshold scoring for specific gestures occur the gesture overlaid on video data 704 may pass the event to a database 705 which is then routed to human reviewer 706 for inspection, labeling and/or validation. The human reviewer's role may differ based on the data they are reviewing. For example, when reviewing gesture data with low confidence, the reviewer may not be evaluating a binary event (i.e., in the case of thermal review, the review is whether the temperature makes sense or not), for example reclassifying the gesture (i.e., relabeling a falsely identified cough as a water bottle), adding classifications (i.e., agree with cough assessment and add a sneeze), or changing the count of events (i.e., three coughs seen by reviewer versus two seen by the algorithm). This holds true for other multispectral data that may include, but is not limited to, audio analysis, active/passive terahertz, LIDAR, and radar signatures.

The curated, reviewed, annotated, reclassified and/or validated data from the human reviewer 706 may then serve as refined training data for model refinement. Human labeled data is used for training the algorithm. Hence, when new data is labeled by a human, the data may then be sent to a local database or directly to a cloud-based database wherein the master illness model may be retrained on a continual basis. In doing so, the model progressively gets more accurate over time with multiple input streams from human relabeling. Upon retraining and validating the model's increased accuracy, the new model can be pushed to local installations of the software either on demand or at a scheduled maintenance update.

Figure 8:
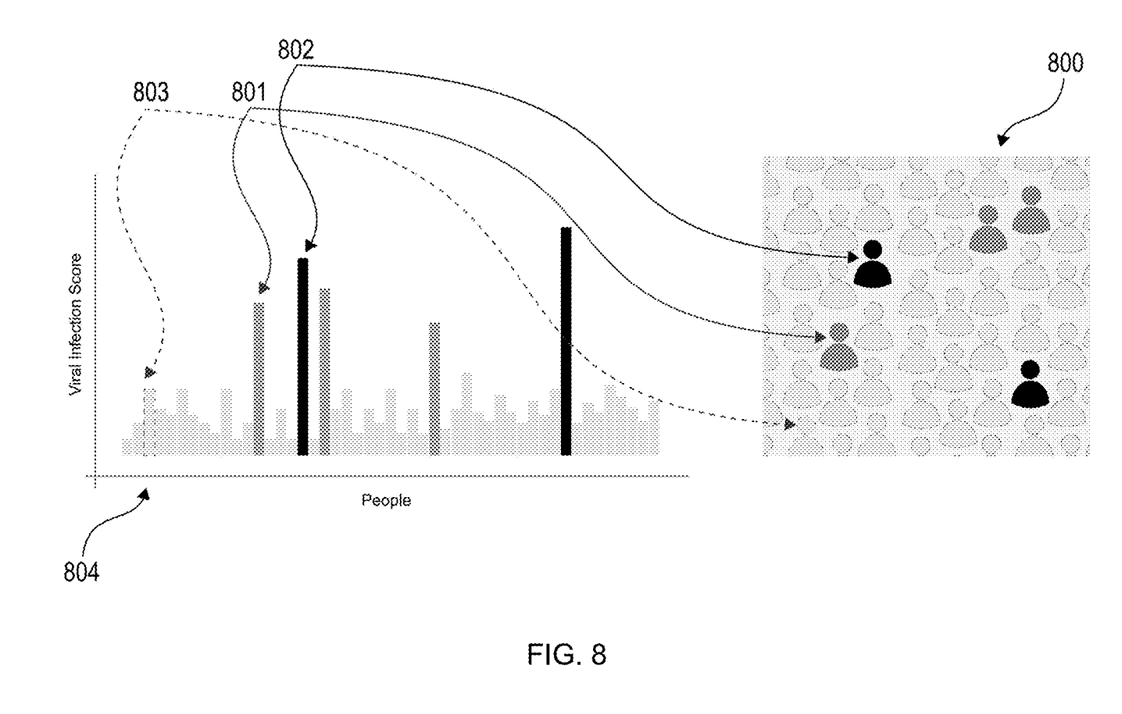
FIG. 8 illustrates as an example the use of the system to scan large populations in near real-time for viral infections, based on criteria for screening. This embodiment enables precise targeting of a specific individual with symptoms resembling a high contagion virus.

From an epidemiological context, the need for rapid identification of viral vectors in public areas including but not limited to mass transit, government buildings, stadiums, airports, municipal complexes and others will abate the spread of viral contagions, specifically highly contagious viruses with a R-score greater than 1. As shown in FIG. 8, an embodiment of a near real-time system may scan populations en-mass to address public health exposure concerns. The network of CCTV video and multispectral camera systems 301 would scan a population 800. The video and multispectral feeds may be processed through a local database 505 or a cloud-based system 506, wherein the artificial intelligence processor 507 may use normalization algorithms 404 to generate high-dimensional data matrices to track and evaluate individuals based on a unique signature of visual and multispectral data. The high-dimensional matrices may contain information including but not limited to i) temperature, ii) counts and types of visual gestures over a specific time frame, iii) audio signatures, iv) unique visual features. Each matrix of data may undergo further algorithmic analysis to create a dynamic real-time viral infections score, that may be represented in a human-interpretable visual format such as a histogram or 2-D/3-D/4-D overlay representation of the population 804. The viral infection score may be triaged into high, medium, and low probability segments. For example, viral infection scores that report within one standard deviation from the normal distribution mean may be classified as healthy 803. Individuals in populations that consistently report within two standard deviations from the normal distribution mean may represent a medium risk population 801. Medium risk populations 801 may be weighted for closer followup, or favored for weighted time for algorithm processing time. High risk individuals 802, report viral infection score three standard deviations from the normal distribution mean, representing a strong viral infection score. High risk individuals 802 may present in medical distress or require medical attention. The information notification relay 511 may submit viral infection data to medical or institutional agents in order to make better informed decisions on individuals requiring medical care.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

Although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
obtaining, using a camera system comprising two or more cameras deployed in two or more locations of an environment, imagery of one or more individuals in an environment;
analyzing, using a processor, the imagery using a trained model to identify at least one of the one or more individuals and recognize gestures of the at least one individual that are indicative of a respiratory sickness behavior above a calculated threshold;
the respiratory sickness behavior comprising one or more of coughing, touching a predefined area of the body, and gestural movements to indicate a restricted airflow;
tracking, using the camera system, the at least one of the one or more individuals displaying the respiratory sickness behavior across the two or more locations;
presenting, using a display device, information about the at least one individual being tracked and displaying the respiratory sickness behavior above the calculated threshold.

2. The method of claim 1, wherein the obtaining comprises using the camera system to obtain one or more of infrared and multi spectral imagery comprising temperature data.

3. The method of claim 2, wherein the analyzing, by the trained model, comprises using the temperature data an indicator of sickness behavior.

4. The method of claim 1, wherein the two or more locations comprise one or more indoor rooms of a site.

5. The method of claim 4, wherein the camera system comprises a closed circuit television (CCTV) system.

6. The method of claim 4, comprising storing data spanning a visit of the at least one individual to the site in a database.

7. The method of claim 6, where the database is expanded based on multiple visits to the site or shared with other sites to build a more detailed sickness profile of the at least one individual.

8. The method of claim 7, comprising matching a gesture history of an individual against one or more signatures for various types or families of illnesses.

9. The method of claim 1, where the camera system is comprised of a centralized network of cameras, a single camera, or multiple portable imaging systems.

10. A method, comprising:
obtaining, using a camera system, one or more images or videos of a group of individuals;
analyzing, using a processor, the one or more images or videos using a trained model, wherein the trained model is trained using one or more of existing libraries of images, gesture recognition from multiple consecutive frames, heat signatures from infrared cameras, or a fusion of more than one of the images, gesture recognition, and heat signatures;
analyzing, using a processor, identifiers corresponding to each individual recognized in the group of individuals and creating a record in a database of each recognized individual;
analyzing, using a processor, one or more sickness behaviors performed by each individual and appending the one or more sickness behaviors to a record in the database corresponding to an individual in the group of individuals; and
analyzing, using a processor, an identity of each recognized individual, using other databases that are linked to the database.

11. The method of claim 10, where a history of a path of an individual of the group of individuals and actions thereof are recorded in the database for subsequent review.

12. The method of claim 10, comprising aggregating and indexing by time materials a specific individual of the group of individuals comes in contact with.

13. The method of claim 10, comprising identifying and storing in a database an identity of one or more individuals coming in contact with or proximity to a specific individual in the group of individuals.

14. The method of claim 10, comprising sending to a display results of an individual of the group of individuals along with any identifying information, a history of flagged images or gestures, and a visual description.

* * * * *